Nov. 5, 1946.  I. O. WITTE  2,410,560
JOINT FOR LEG BRACES
Filed Nov. 29, 1944
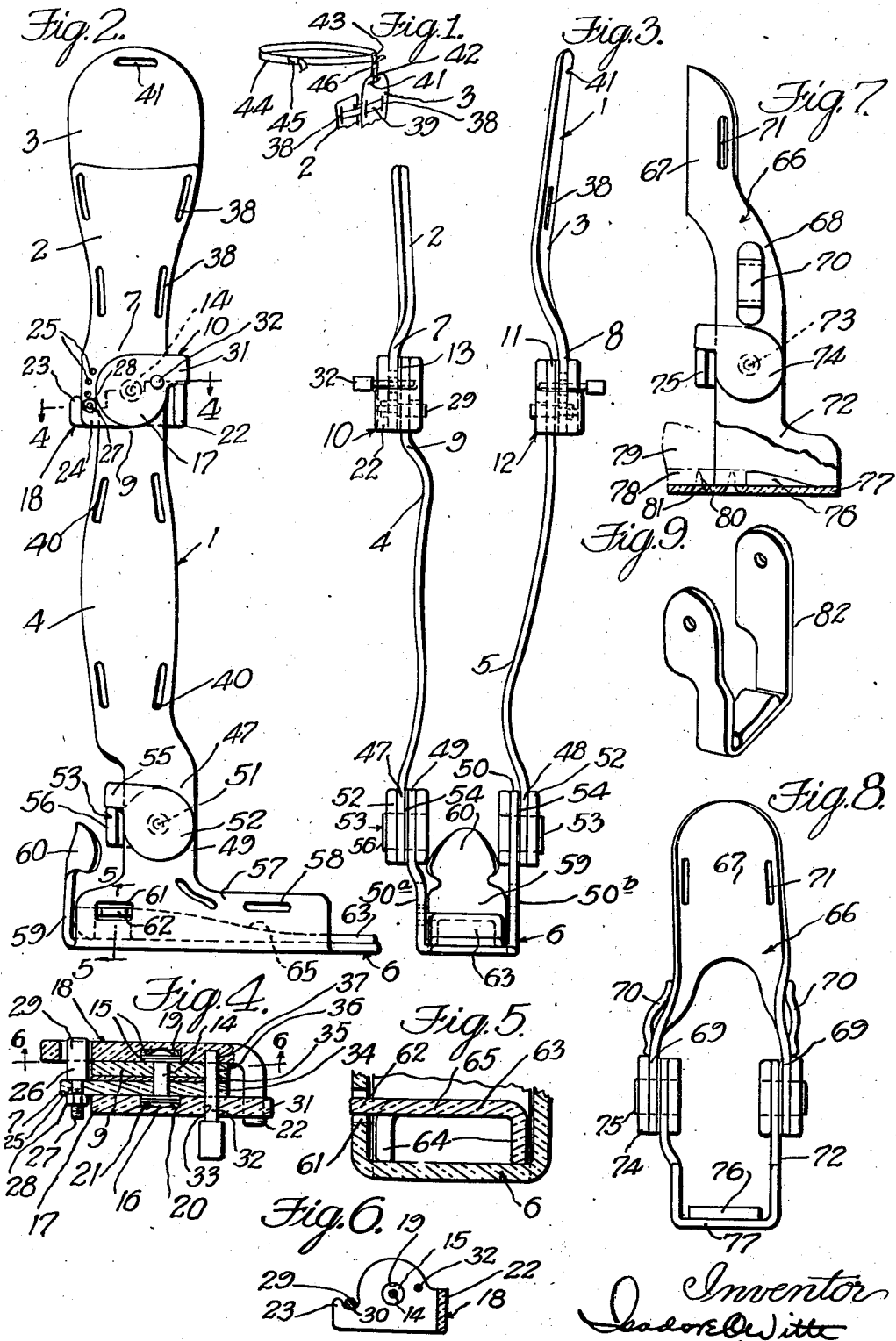
Inventor
Isadore O. Witte

UNITED STATES PATENT OFFICE 2,410,560

JOINT FOR LEG BRACES

Isadore O. Witte, Los Angeles, Calif.

Application November 29, 1944, Serial No. 565,641

7 Claims. (Cl. 287—101)

This invention relates to improvements in orthopedic appliances, and more particularly to a brace or support for a fractured or deformed limb.

This invention consists in the matters hereinafter set forth, and more particularly pointed out in the appended claims.

In the drawing, Figure 1 is a fragmentary perspective view embodying features of the invention. Figure 2 is a side elevational view. Figure 3 is a front elevational view. Figure 4 is a section taken on the line 4—4 of Fig. 2. Figure 5 is a section taken on the line 5—5 of Fig. 2. Figure 6 is a section taken on the line 6—6 of Fig. 4. Figure 7 is a side elevational view of a modified form of the invention. Figure 8 is a front elevational view of Fig. 7. Figure 9 is a perspective view of a further modified form of a foot support.

Referring more particularly to the drawing, I indicates a brace, which in this instance is for the left leg. The brace I comprises thigh portions 2 and 3, leg portions 4 and 5 and a foot portion 6.

The lower ends of the thigh portions 2 and 3 are offset as at 7 and 8 respectively. The upper end of the leg portion 4 is offset as at 9. The offset ends 7 and 9 are connected together by a joint 10. The upper end 11 of the portion 5 and the offset end 8 are connected by a joint 12, the joints 10 and 12 being similar in construction, and together form a knee joint.

The brace I in the present instance is formed of plastic material. A washer 13 of plastic material is arranged between the portions 7 and 9. A metal pivot pin 14 is mounted in the washer 13 and the portions 7 and 9. A pair of metal washers 15 are arranged on each end of the pin 14 in abutment with the outer face of the ends 7 and 9. The ends of the pin 14 are peened over as shown at 16 to form a head. A plastic stop member 17 is fixed to the outer face of the portion 7 in any suitable manner. A plastic stop member 18 is fixed in any suitable manner to the inner face of the portion 9.

The stop member 18 and the stop member 17 are provided with aligned recesses 19 and 20 respectively adapted to receive the washers 15 and the heads 16. The recesses 19 and 20 are then filled with sealing material 21. The stop member 18 is provided at one end with an angular projection 22 and at the other end with a hook formation 23.

The portion 7 is substantially wider at one side 24 than the stop member 18 and is provided with radial openings 25.

A pin 26 is provided with a threaded recessed stem 27 adapted to be inserted in one of the openings 25. A nut 28 is threaded on the stem 27 whereby to lock the pin 26 to the portion 24 as clearly shown in Fig. 4.

The head 29 of the stop member 26 is adapted to engage the groove 30 of the hook member 23 whereby to limit backward movement of the thigh portions 2 and 3. The stop member 17 is provided with a forward tongue 31 adapted to engage the projection 22 whereby to limit forward movement of the portion 2.

A pin 32 is adapted to be inserted into aligned openings 33, 34, 35, 36 and 37 of the stop member 17, portion 7, washer 13, portion 9 and the stop member 18 respectively whereby to lock the portions 2 and 4 against movement.

The joint 12 provides a similar arrangement for the portions 3 and 5 as above described for the joint 10.

With this arrangement knee action of the wearer is adjustably limited in one direction, limited in the other direction and may be locked against either direction. The portions 2 and 3 are provided with aligned slots 38 adapted to receive straps 39. The portions 4 and 5 are provided with aligned slots 40 adapted to receive similar straps (not shown). The upper end of the portion 3 is provided with a slot 41 adapted to receive one end 42 of a strap 43 attached to a belt 44. The belt 44 is provided with a buckle 45. The end 42 is attached to the upper portion of the strap 43 by means of a buckle 46.

The leg portions 4 and 5 are provided at their lower ends with offset portions 47 and 48 respectively, which are pivotally connected to the upper ends 49 and 50 of the side walls 50ª and 50ᵇ formed on the foot portion 6, by means of a pin 51. Stop members 52 are attached to the outer faces of the portions 47 and 48. Stop members 53 are attached to the inner faces of the portions 49 and 50. Washers 54 are arranged between the portions 47, 49 and 48, 50.

Connection between the top member 53 and the stop member 52 is similar to that described for the joints 10 and 12, the tongue 55 and the projection 56 being rearward instead of forward. The side walls 50ª and 50ᵇ are elongated and are provided at their forward ends 57 with aligned slots 58 adapted to receive an attaching strap (not shown). The foot portion 6 is provided with a back wall 59 having an ankle receiving portion 60. The rear end of the side wall 50ª is provided with a slot 61 adapted to receive a tongue 62 formed on a foot rest 63. The foot rest 63 is of inverted U shape, the side walls 64 being arranged adjacent the inner faces of the walls 50ª and 50ᵇ. The top wall 65 is shaped to the contour of the bottom of a foot.

The foot portion 6 is flexible, the walls 50ª and 50ᵇ being adapted to be spread apart to permit insertion of the tongue 62 in the slot 61 whereby to hold the foot rest 63 in place.

In Figs. 7 and 8 is shown a modified form of the invention wherein the leg portion is formed of one piece 66, having a curved upper wall 67 and depending forwardly extending side walls 68 which are offset outwardly as at 69. Strap receiving tongues 70 are attached in any suitable manner to the outer faces of the wall 68. Strap receiving slots 71 are formed in the forward ends of the portion 67. The leg portion 66 is pivotally connected to a foot portion 72 by means of a pin 73, the stop member 74 and stop 75 arrangement being similar to the stop member 52 and stop 53. A heel stop 76 is attached to an elongated bottom wall 77 of the foot portion 72. In Fig. 7 the forward end of a heel 78 of a shoe 79 is shown in abutment with the stop 76. Arranged in the bottom wall 77 are aligned openings 81 through which screws 80 are adapted to be screwed into the heel 78.

In Fig. 9 is shown a support for the foot in the form of a stirrup 82.

Having thus described my invention what I claim is:

1. In a device of the class described, including in combination, inner and outer limb sections pivotally connected together, a stop member mounted on each of said sections, a transverse projection formed on the inner stop member, a lateral projection formed on the outer stop member adapted to engage said transverse projection whereby to limit movement of said limbs in one direction, and means for adjustably locking said limb members against movement in the other direction.

2. In a device of the class described, including in combination, a pair of limb sections, one section having one end arranged in overlapping relation with one end of the other section, pivotal means for said ends, a stop member fixed to each of said ends, a transverse projection formed on one of said stop members, a lateral projection formed on the other of said stop members adapted to engage said transverse projection whereby to limit pivotal movement in one direction, and means forming engagement between one of said limb sections and said first named stop member whereby to adjustably limit pivotal movement in the other direction.

3. In a device of the class described, including in combination, a pair of limb sections, one section having one end arranged in overlapping relation with one end of the other section, pivotal means for said sections, a stop member fixed to each of said sections, a transverse projection formed on one of said stop members, a lateral projection formed on the other of said stop members adapted to engage said transverse projection whereby to limit pivotal movement in one direction, one of said ends having holes radially spaced circumferentially with respect to said pivotal means, and a pin having one end removably mounted in one of said holes, the stop member in the other of said ends having a groove adapted to receive the other end of said pin whereby to limit movement in the other direction.

4. In a device of the class described, including in combination, a pair of limb sections, one section having one end arranged in overlapping relation with one end of the other section, pivotal means for said ends, a stop member fixed to each of said ends, a transverse projection formed on one of said stop members, and a lateral projection formed on the other of said stop members adapted to engage said transverse projection whereby to limit pivotal movement in one direction.

5. In a device of the class described, including in combination, a pair of limb sections, one section having one end arranged in overlapping relation with one end of the other section, pivotal means for said ends, a stop member fixed to each of said ends, a transverse projection formed on one of said stop members, a lateral projection formed on the other of said stop members adapted to engage said transverse projection whereby to limit pivotal movement in one direction, and means for locking said limb sections against movement.

6. In a device of the class described, including in combination, a pair of limb sections, one section having one end arranged in overlapping relation with one end of the other section, a pivot pin forming connection between said ends, a washer mounted on said pin between said ends, a stop member fixed to each of said ends and each having a recess formed therein adapted to receive the ends of said pin whereby to completely enclose said pivot pin, means formed on said members for limiting movement in one direction, and means forming engagement between one of said stop members and one of said ends for adjustably limiting movement in the other direction.

7. In a device of the class described, including in combination, a pair of limb sections, one section having one end arranged in overlapping relation with one end of the other section, a pivot pin forming connection between both ends, a washer mounted on said pin between said ends, a stop member fixed to each of said ends, a transverse projection formed on one of said stop members, a lateral projection formed on the other of said stop members adapted to engage said transverse projection whereby to limit pivotal movement in one direction, and means forming engagement between one of said limb sections and said first named stop member whereby to adjustably limit pivotal movement in the other direction.

ISADORE O. WITTE.